(12) United States Patent
Jeong et al.

(10) Patent No.: US 8,249,669 B2
(45) Date of Patent: Aug. 21, 2012

(54) SLIDE MODULE AND PORTABLE TERMINAL HAVING THE SAME

(75) Inventors: Byoung-Cheon Jeong, Gyeonggi-Do (KR); Hyo-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 12/556,916

(22) Filed: Sep. 10, 2009

(65) Prior Publication Data

US 2010/0073854 A1  Mar. 25, 2010

(30) Foreign Application Priority Data

Sep. 19, 2008 (KR) ......................... 10-2008-0092380
Mar. 20, 2009 (KR) ......................... 10-2009-0024167

(51) Int. Cl.
*H04M 1/00* (2006.01)
*H04B 1/38* (2006.01)
(52) U.S. Cl. .................. 455/575.1; 455/90.3; 455/575.4
(58) Field of Classification Search ............... 455/575.1, 455/575.4, 90.3
See application file for complete search history.

(56) References Cited

U.S. PATENT DOCUMENTS

| | | | | |
|---|---|---|---|---|
| 5,133,433 A | * | 7/1992 | Oosawa | 188/290 |
| 7,599,721 B2 | * | 10/2009 | Taki et al. | 455/575.1 |
| 7,752,710 B2 | * | 7/2010 | Lin | 16/334 |
| 2001/0036266 A1 | * | 11/2001 | Gronroos et al. | 379/433.01 |
| 2006/0030381 A1 | * | 2/2006 | Byun et al. | 455/575.4 |
| 2006/0068859 A1 | * | 3/2006 | Lee et al. | 455/575.4 |
| 2007/0032278 A1 | * | 2/2007 | Lee et al. | 455/575.4 |
| 2008/0007870 A1 | * | 1/2008 | Lee | 360/133 |
| 2008/0120806 A1 | * | 5/2008 | Liu | 16/277 |
| 2008/0194304 A1 | * | 8/2008 | Satoshi et al. | 455/575.4 |
| 2008/0301909 A1 | * | 12/2008 | Chien et al. | 16/362 |
| 2010/0048264 A1 | * | 2/2010 | Sato et al. | 455/575.4 |

FOREIGN PATENT DOCUMENTS

| | | |
|---|---|---|
| EP | 1150476 A2 | 10/2001 |
| KR | 10-2008-0005087 A | 1/2008 |
| KR | 10-0807712 B1 | 2/2008 |
| KR | 10-0848114 B1 | 7/2008 |
| WO | WO 2008/004822 A1 | 1/2008 |
| WO | WO 2009/048185 A1 | 4/2009 |

* cited by examiner

*Primary Examiner* — Simon Nguyen
(74) *Attorney, Agent, or Firm* — Birch, Stewart, Kolasch & Birch, LLP

(57) ABSTRACT

A portable terminal having a slide module, comprising: first and second slide members coupled to first and second bodies, respectively, and connected to each other so as to perform a sliding motion with respect to each other; and an elastic force providing unit for providing an elastic force to one of the first and second slide members, wherein the elastic force providing unit comprises: first and second arm members each having one end coupled to the first or second slide member, and another ends coupled to each other so as to perform a relative motion with respect to each other; and an elastic unit configured to generate the elastic force by a relative motion of the first and second arm members.

12 Claims, 12 Drawing Sheets

SLIDE MODULE AND PORTABLE TERMINAL HAVING THE SAME

CROSS-REFERENCE TO A RELATED APPLICATION

Pursuant to 35 U.S.C. §119(a), this application claims the benefit of earlier filing date and right of priority to Korean Application Nos. 10-2008-0092380 and 10-2009-0024167 filed in Republic of Korea on Sep. 19, 2008 and Mar. 20, 2009, respectively, the contents of which is incorporated by reference herein in its entirety.

BACKGROUND OF THE INVENTION

1. Field of the Invention

The present invention relates to a portable terminal, and particularly, to a portable terminal having a slide module configured so that one body is opened and closed by being slid with respect to another body.

2. Background of the Invention

In general, a portable terminal is a device that can be carried around and has one or more functions such as to perform voice and video call communications, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions As the portable terminal is regarded as a personal belonging to express a user's personality, various designs have been required. One of the various designs, a thickness of the portable terminal is required to be thinner. For instance, a slide module having a thin thickness may be considered.

SUMMARY OF THE INVENTION

Therefore, an object of the present invention is to provide a slide module having a thickness thinner than that of the conventional one, and a portable terminal having the same.

Another object of the present invention is to provide a slide module having an enhanced reliability, and a portable terminal having the same.

To achieve these and other advantages and in accordance with the purpose of the present invention, as embodied and broadly described herein, there is provided a portable terminal having a slide module, comprising: first and second slide members coupled to first and second bodies, respectively, and connected to each other so as to perform a sliding motion with respect to each other; and an elastic force providing unit for providing an elastic force to one of the first and second slide members, wherein the elastic force providing unit comprises: first and second arm members each having one end coupled to the first or second slide member, and another ends coupled to each other so as to perform a relative motion with respect to each other; and an elastic unit configured to generate the elastic force by a relative motion of the first and second arm members.

Here, the first and second arm members have one ends each coupled to the first or second slide member, and another ends coupled to each other so as to perform a relative motion with respect to each other.

Here, the elastic unit is configured so as to generate an elastic force by a relative motion of the first and second arm members.

According to one aspect of the present invention, the first and second arm members are coupled to each other so as to perform a relative motion with respect to each other. The first and second arm members may be configured in the form of plates. The elastic unit may be formed so that at least a part thereof can be wound by a relative motion of the first and second arm members. The elastic unit may be implemented as a spiral wound toward a central portion from an outer circumference on the same plane. The elastic force providing unit may be formed so as to provide a repulsive force to the first and second arm members, the repulsive force due to a bending moment occurring at the elastic unit in a direction that the elastic unit is wound.

According to another aspect of the present invention, at least one end of the elastic unit may be positioned at a central portion of the spiral. A limiting portion for limiting motion of the elastic unit due to its elastic force may be formed at one of the first and second arm members. Another end of the elastic unit may be formed at a region out of an outer circumference of the elastic unit.

According to still another aspect of the present invention, the first and second arm members overlap each other at another ends thereof. The elastic unit may be positioned at the overlapped part of the first and second arm members. Through holes may be formed at the overlapped part of the first and second arm members. The first and second arm members may be connected to each other by a connection shaft penetrating the through holes. One end of the elastic unit may be formed in a circular belt shape so that at least a part of the connection shaft can be inserted thereinto. A groove for inserting at least a part of the elastic unit may be formed at the connection shaft.

According to still another aspect of the present invention, the elastic force providing unit comprises one or more protrusions. The protrusion is formed so that at least a part thereof can face an outer circumference of the circular belt. The protrusion may be protruding from at least one of the first and second arm members. The protrusion and the elastic unit may be coupled to each other by a welding process.

According to still another aspect of the present invention, the elastic force providing unit is formed so as to be symmetrical based on the overlapped part of is the first and second arm members. The elastic force providing unit may be formed to have the same appearance in both directions toward outer surfaces opposite to facing surfaces of the first and second arm members.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
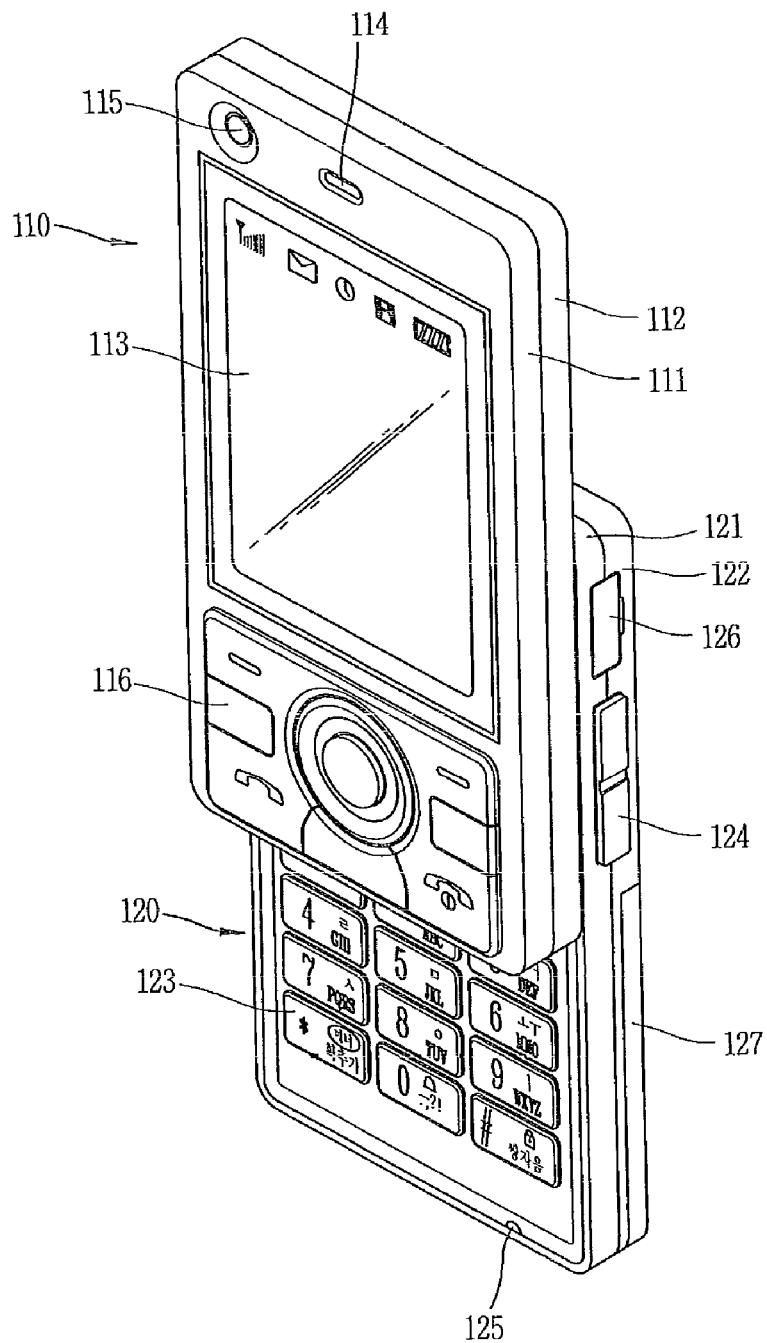
FIG. 1 is a perspective view of a portable terminal according to one embodiment of the present invention.

Description will now be given in detail of the present invention, with reference to the accompanying drawings.

Hereinafter, a slide module and a portable terminal having the same according to the present invention will be explained in more detail.

The same reference numerals will be given to the same components as those of the aforementioned embodiment, and their explanations will be omitted. The singular expression of the present invention may include a plural concept unless distinctively differently defined.

FIG. 1 is a perspective view of a portable terminal according to one embodiment of the present invention.

The portable terminal of the present invention comprises a first body 110 and a second body 120 coupled to each other for an opened or closed configuration by being slid with respect to each other.

The second body 120 is configured so as to be slidable with respect to the first body 110 in at least one direction. The present invention may not be limited to the slide type portable terminal, but may be applied to various types such as a bar type, a folder type, a swing type, and a swivel type.

A state that the first body 110 completely overlaps the second body 120 may be referred to as a 'closed configuration', whereas a state that one or more parts of the second body 120 are exposed by the first body 110 may be referred to as an 'opened configuration'.

Under the closed configuration, the portable terminal is operated in a standby mode. However, the standby mode may be released by a user's manipulation. On the contrary, under the opened configuration, the portable terminal is operated in a call mode, etc. The call mode may be converted into the standby mode by a user's manipulation or after time lapses.

A case forming the appearance of the first body 110 (casing, housing cover, etc.) is formed by a front case 111 and a rear case 112. Each kind of electronic components are mounted in a space formed by the front case 111 and the rear case 112. If desired, one or more intermediate cases may be provided between the front case 111 and the rear case 112. The front and rear cases are usually formed by injection-molding resin material, or formed using metallic material such as stainless steel (STS) and titanium (Ti).

On the front case 111 of the first body 110, may be disposed a display unit 113, a first audio output unit 114, a first image input unit 115 or a first manipulation unit 116. The display unit 113 may be implemented as a Liquid Crystal Display (LCD) module or an Organic Light Emitting Diodes (OLED) module, a Transparent OLED (TOLED) module, and so on.

The display unit 113 may also be configured to include a touch screen for allowing information to be input by a user's touch. And, the display unit 113 may is be configured to generate various tactile effects when being touched by a user. This may be implemented by a haptic module interworking with the display unit 113. A representative tactile effect generated by the haptic module includes vibration. The haptic module may be variously arranged according to configuration aspects of not only the display unit 113, but also the portable terminal.

The first audio output unit 114 may be implemented as a speaker or a receiver. The first image input unit 115 may be implemented as a camera module configured to capture a user's still images or moving images. The first manipulation unit 116 is configured to receive commands to control the operation of the portable terminal according to the present invention.

Like the first body 110, a case of the second body 120 may be formed by a front case 121 and a rear case 122.

A second manipulation unit 123 may be disposed on a front surface of the front case 121 of the second body 120. A third manipulation unit 124, an audio input unit 125, and an interface 126 may be disposed on at least one of the front case 121 and the rear case 122. The first to third manipulation units 116, 123 and 124 may be referred to as a manipulation unit, and may include any type of ones that can be manipulated in a user's tactile manner.

The manipulation unit may be implemented as dome switches or a touch screen or a touch pad for receiving commands or information by a user's push or touch operation, or may be implemented as a jog wheel or a joystick In the aspect of functions, the first manipulation unit 116 may be used to input commands such as START, END, and SCROLL, and the second manipulation unit 123 may serve numbers, characters, symbols, etc. And, the third manipulation unit 124 may serve as hot keys for performing specific functions such as activation of the first image input unit 115.

The audio input unit 125 may be implemented as a microphone so as to receive a user's voice or another sounds. The interface 126 may serve as a passage through which the portable terminal of the present invention exchanges data with an external device. For instance, the interface 126 may be implemented as at least one of a wired/wireless connection port for connecting an earphone to the portable terminal, a short-range communications port (e.g., an Infrared Data Association (IrDA) port, a Bluetooth port, a wireless LAN port, etc.), power supply ports for providing power to the portable terminal, or the like. The interface 126 may be configured using a card socket (e.g., for coupling to a memory card, a subscriber identity module (SIM) card, a user identity module (UIM) card, etc.).

A power supply unit 127 for supplying power to the portable terminal is mounted at the rear case 122. The power supply unit 127 may be a rechargeable battery, for example, to be detachably mounted to the rear case 122 for charging.

Figure 2:
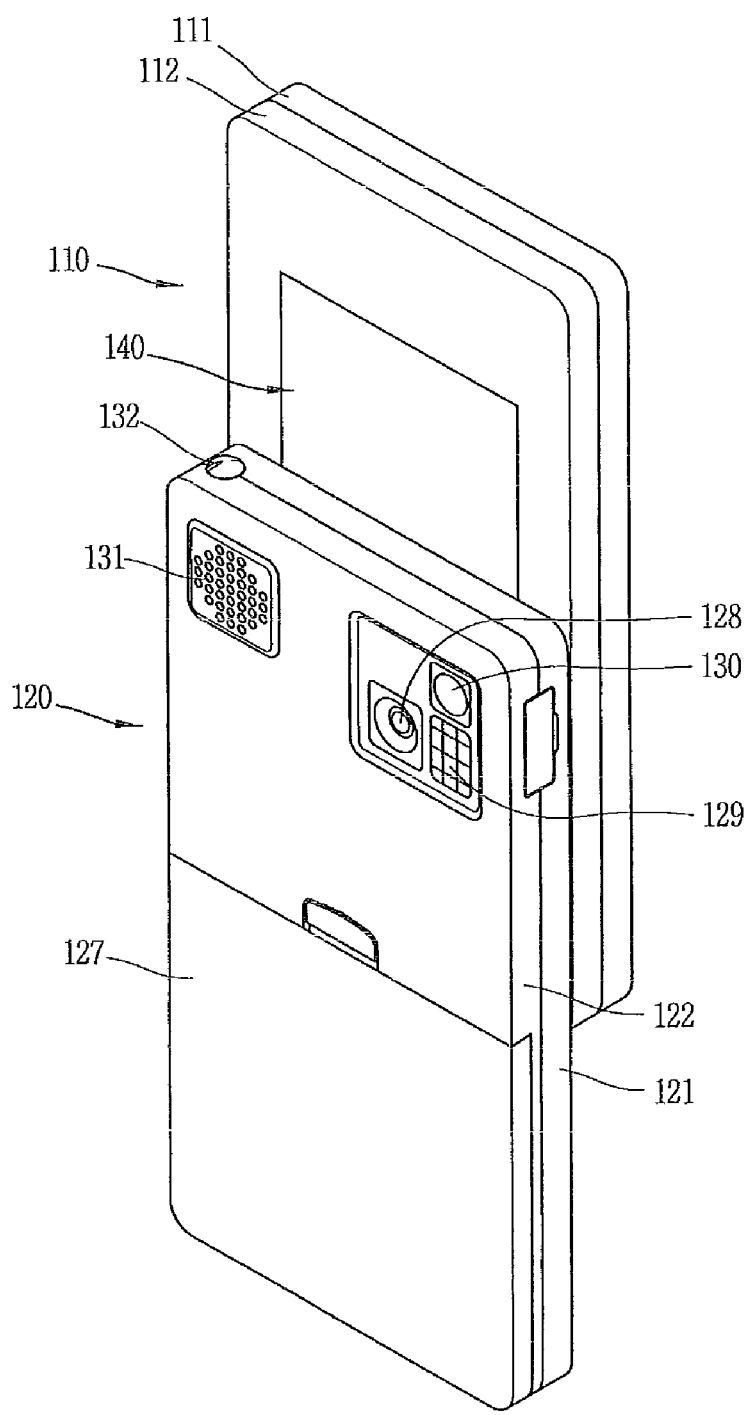
FIG. 2 is a perspective view of a rear surface of the portable terminal of FIG. 1.

FIG. 2 is a perspective view of a rear surface of the portable terminal 100 of FIG. 1.

Referring to FIG. 2, a second image input unit 128 may be additionally mounted to a rear surface of the rear case 122. The second image input unit 128 faces a direction which is opposite to a direction faced by the first image input unit 115 (refer to FIG. 1), and may have pixels different from those of the first image input unit 115. For example, the first image input unit 115 may operate with relatively lower pixels (lower resolution). Thus, the first image input unit 115 may be useful when a user can capture his face and send it to a calling party in a video call mode or the like. On the other hand, the second image input unit 128 may operate with a relatively higher pixels (higher resolution) such that it can be useful is for a user to obtain higher quality pictures for later use.

A flash 129 and a mirror 130 may be additionally disposed adjacently to the second image input unit 128. When capturing an object by using the second image input unit 128, the flash 129 provides light to the object. The mirror 130 can cooperate with the second image unit 128 to allow a user to photograph himself or herself in a self-portrait mode.

A second audio output unit 131 may be additionally disposed at the rear case 122. The second audio output unit 131 may implement a stereo function together with the first audio output unit 114 (refer to FIG. 1), and may be used for calling in a speaker phone mode. A broadcast signal receiving antenna 132 as well as an antenna for calling may be disposed at one side of the rear case 122. The broadcast signal receiving antenna 132 may be configured to retract into the second body 120.

One portion of a slide module 140 that slidably couples the first body 110 and the second body 120 to each other is disposed at the rear case 112 of the first body 110.

Another portion of the slide module 140 is disposed at the front case 121 of the second body 120, thereby not being exposed out.

It was explained that the second image input unit 128 is disposed at the second body 120. However, the position of the second image input unit 128 is not limited to the second body 120. For instance, at least one of the components 128 to 132 originally disposed at the rear case 122 may be mounted to the rear case 112 of the first body 110. In this case, the components disposed at the rear case 112 may be protected by the second body 120 in the closed configuration. Furthermore, even if the second image input unit 128 is not additionally provided, is the first image input unit 115 configured to be rotatable may capture an image even in a capturing direction by the second image input unit 128.

Figure 3:
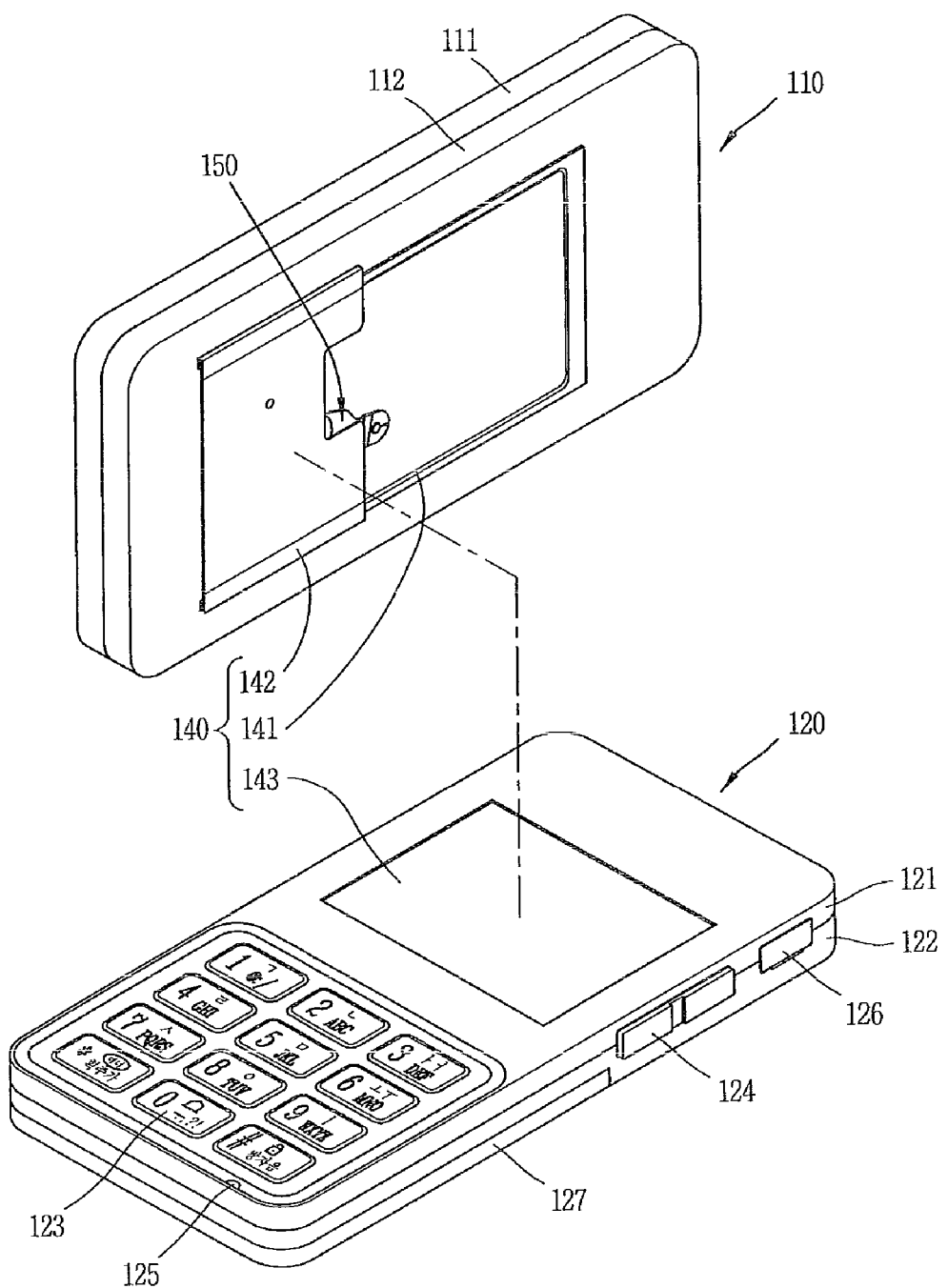
FIG. 3 is a disassembled perspective view of first and second bodies of the portable terminal of FIG. 1.

FIG. 3 is a disassembled perspective view of the first body 110 and the second body 120 of the portable terminal of FIG. 1.

The slide module 140 is mounted between the first body 110 and the second body 120, thereby guiding the first body 110 to perform a sliding motion with respect to the second body 120.

The slide module 140 includes a first slide member 141 fixed to the first body 110. A second slide member 142 is slidably coupled to the first slide member 141. The second slide member 142 is fixed to a fixing portion 143 of the second body 120. The first and second slide members 141 and 142 may be integrally formed with the first and second bodies 110 and 120, respectively.

The slide module 140 includes an elastic force providing unit 150 for providing an elastic force to at least one of the first and second slide members 141 and 142 when performing a sliding motion.

Figure 4A:
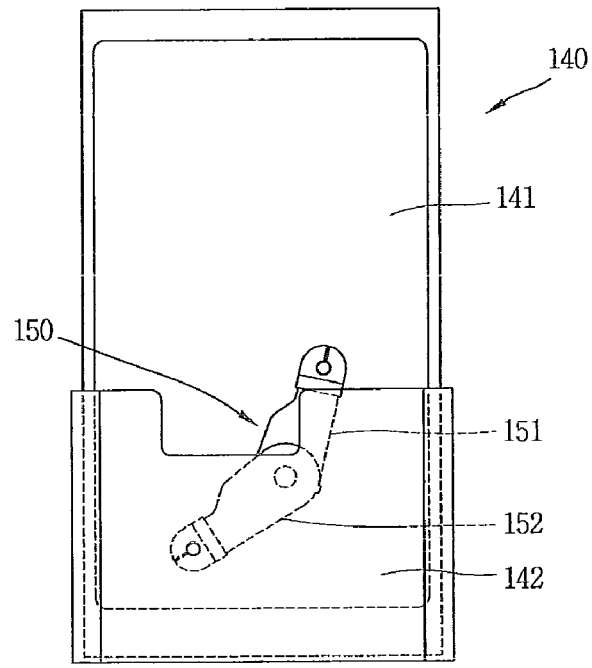
FIGS. 4A to 4C are conceptual views showing an operation of a slide module of FIG. 3.

The elastic force providing unit 150 includes a first arm member 151 and a second arm member 152 (refer to FIG. 4A). The first and second arm members 151 and 152 have one ends each coupled to the first slide member 141 or the second slide member 142, and another ends coupled to each other so as to perform a relative motion with respect to each other.

Here, an elastic unit 160 (refer to FIG. 5) is formed between the first and second arm members 151 and 152 so as to generate an elastic force by a relative motion of the first and second arm members 151 and 152. The elastic unit 160 may be implemented as a spring, and is configured to provide an elastic force to one of the first and second slide members 141 and 142.

The slide module 140 is configured to be stopped at a predetermined position when the portable terminal is slid to an opened configuration from a closed configuration. Referring to FIG. 3, the second slide member 142 is stopped at a position adjacent to one end of the first slide member 141, thereby implementing an opened configuration.

Figure 4B:
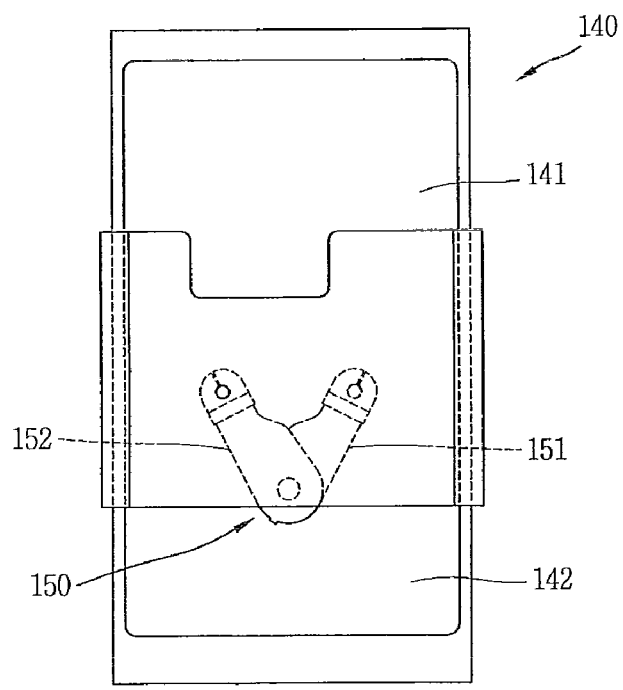
Figure 4C:
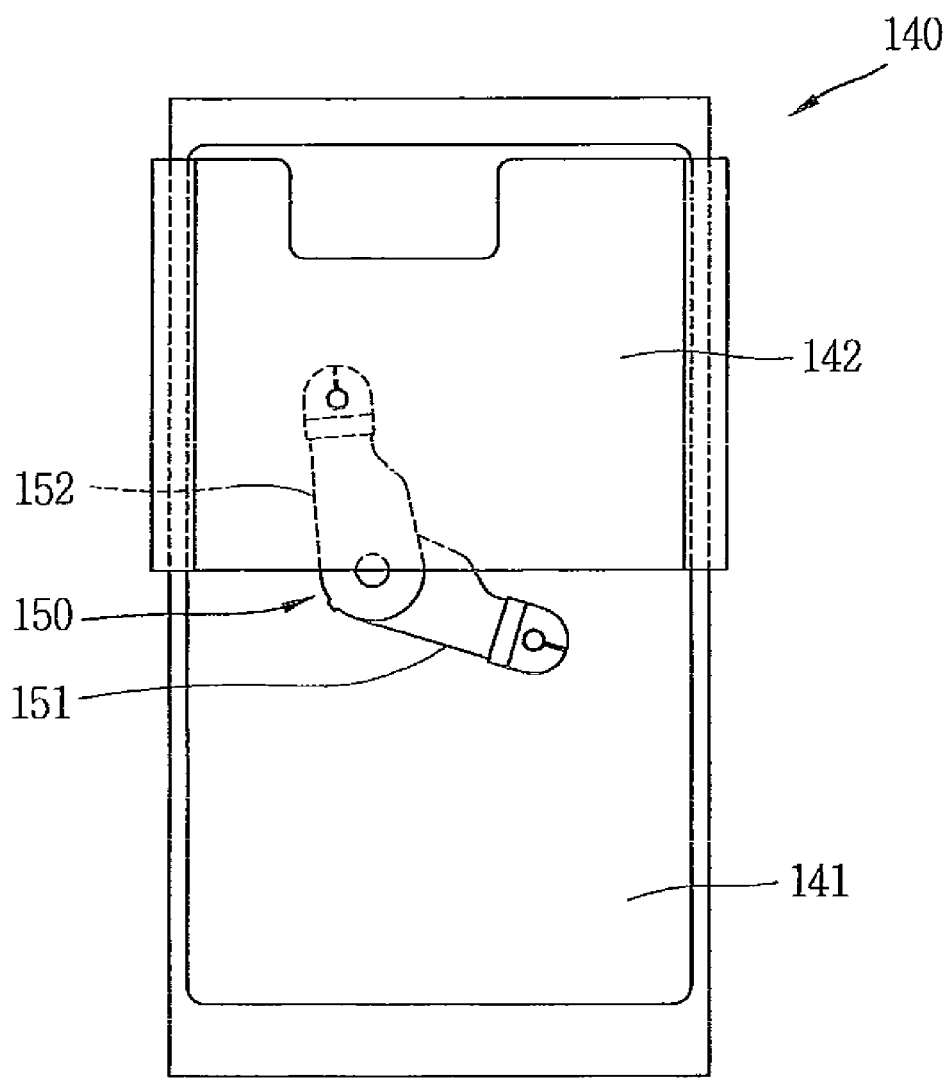

FIGS. 4A to 4C are conceptual views showing an operation of the slide module 140 of FIG. 3.

FIG. 4A shows the slide module 140 when the portable terminal is in an opened configuration. The first and second arm members 151 and 152 are coupled to each other so as to perform a relative motion with respect to each other.

FIG. 4B shows the slide module 140 when the portable terminal performs a sliding motion. The first and second arm members 151 and 152 perform a relative rotation by a sliding motion of the second slide member 142. The elastic unit 160 is configured so that at least a part thereof can be wound by a relative rotation of the first and second arm members 151 and 152.

The elastic unit 160 may be configured so as to provide an elastic force to the second slide member 142 by being wound. Accordingly, when the second slide member 142 is moved by a predetermined distance, the elastic unit 160 generates an elastic force to allow the second slide member 142 to be continuously moved in the moving direction.

Referring to FIG. 4C, the second slide member 142 is stopped at a position adjacent to another end of the first slide member 141, thereby implementing a closed configuration.

Figure 5:
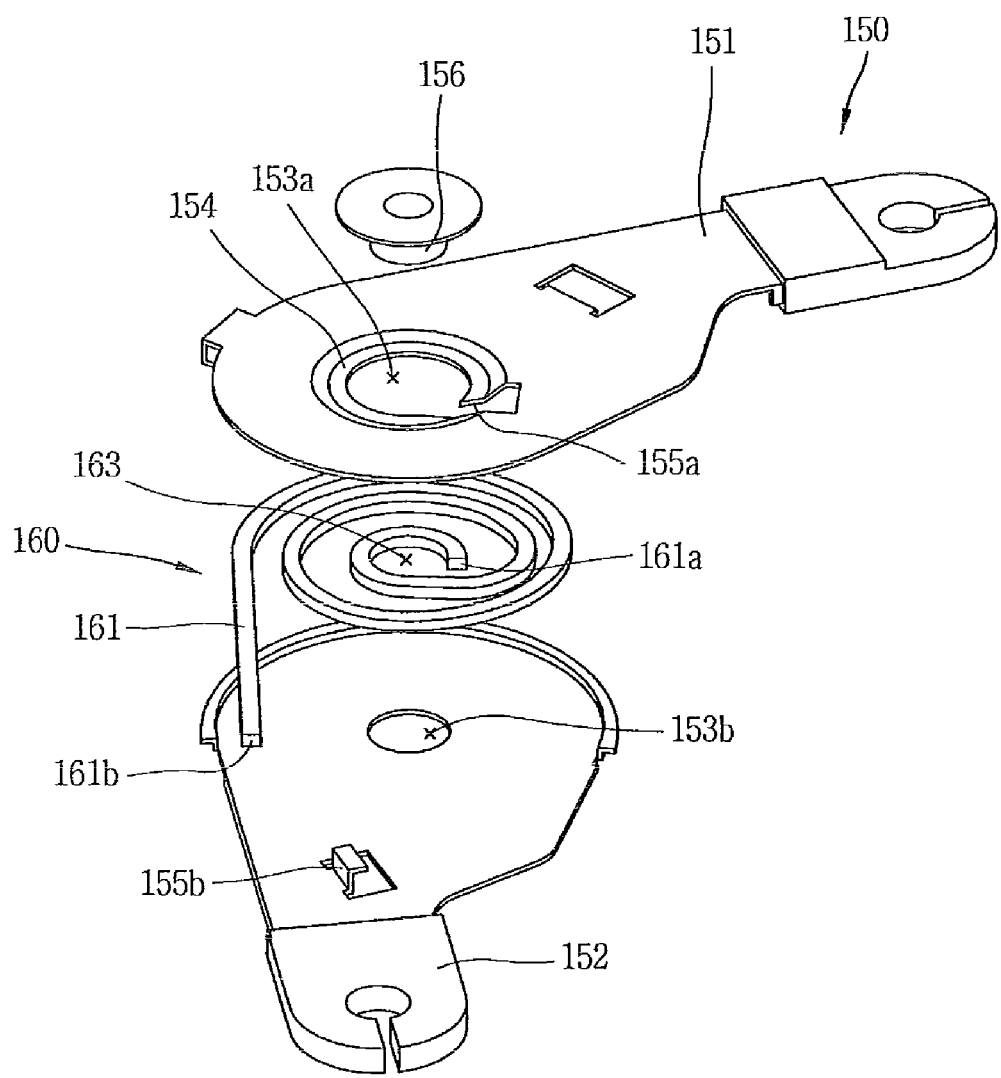
FIG. 5 is a disassembled perspective view of an elastic force providing unit of FIG. 3.
Figure 6A:
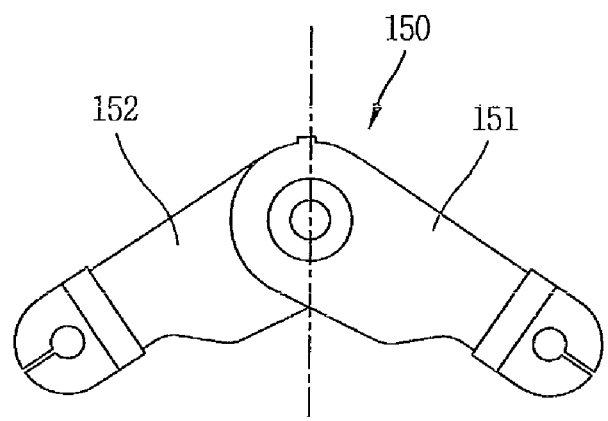
FIGS. 6A and 6B are planar views of the slide module of FIG. 5, which are viewed from both directions.
Figure 6B:
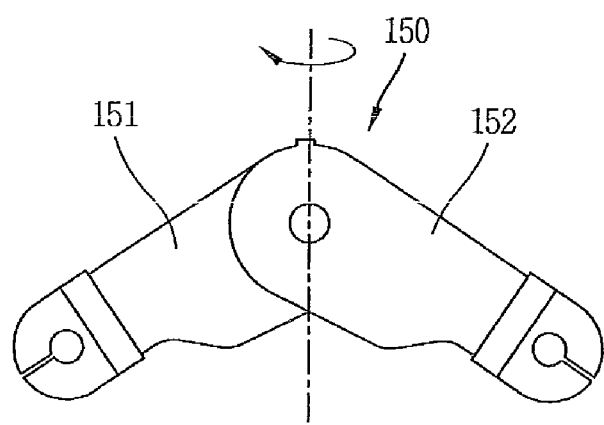

FIG. 5 is a disassembled perspective view of the elastic force providing unit 150 of FIG. 3, and FIGS. 6A and 6B are planar views of the slide module of is FIG. 5, which are viewed from both directions.

The first and second arm members 151 and 152 are implemented in the form of plates. For instance, the first and second arm members 151 and 152 may be implemented as plates formed of metallic material such as stainless steel (SUS). The first and second arm members 151 and 152 each having one end connected to the first slide member 141 or the second slide member 142 (refer to FIG. 3) overlap each other at another ends thereof.

The elastic unit 160 is located at an overlapped part of the first and second arm members 151 and 152. The overlapped part forms a separating space configured to separate the first and second arm members 151 and 152 from each other, and to accommodate the elastic unit 160 therein.

Since the elastic unit 160 is disposed at the overlapped part of the first and second arm members 151 and 152, prevented is distortion of the elastic unit 160 that may occur when the slide module 140 is operated. This enhances reliability of the elastic unit 160.

The elastic unit 160 is wound toward its center from its outer circumference, thereby forming a spiral on the same plane. The elastic unit 160 is formed to have a rectangular section. However, the elastic unit 160 may be formed to have a circular section, etc.

The elastic force providing unit 150 is formed so as to provide a repulsive to force to the first and second arm members 151 and 152, the repulsive force due to a bending moment occurring at the elastic unit 160 in a direction that the elastic unit is wound. At least one end 161$a$ of the elastic unit 160 is positioned at a central portion of the spiral. Another end 161$b$ of the elastic unit 160 is formed to be positioned at a region out of an outer circumference of the elastic unit 160.

Both ends 161a and 161b of the elastic unit 160 are connected to the first and second arm members 151 and 152, respectively. Accordingly, the repulsive force occurring at the elastic unit 160 is provided to the first and second arm members 151 and 152.

The elastic force providing unit 150 is formed to be symmetrical to each other based on an overlapped part of the first and second arm members 151 and 152. Accordingly, the slide module 140 may be symmetrically formed.

The first and second arm members 151 and 152 may be formed to have the same appearance. More specifically, the elastic force providing unit 150 is formed to have the same appearance in both directions toward outer surfaces opposite to facing surfaces of the first and second arm members 151 and 152.

Referring to FIG. 6A, the first arm member 151 covers the second arm member 152. And, referring to FIG. 6B, the second arm member 152 covers the first arm member 151. However, the first and second arm members 151 and 152 have the same shape. Accordingly, even if the slide module 140 turns over, the same shape is implemented. This allows the first and second members 151 and 152 to be assembled to each other in an upside-down state, thereby enhancing an assembly characteristic of the first and second arm members 151 and 152.

Referring to FIG. 5, through holes 153a and 153b are formed at an overlapped part of the first and second arm members 151 and 152. The first and second arm members 151 and 152 may be connected to each other by a connection shaft 156 penetrating the through holes 153a and 153b. The elastic unit 160 may be connected to the connection shaft 156. One end of the elastic unit 160 is formed in a circular belt shape so that at least a part of the connection shaft 152 can be inserted thereinto. An insertion portion 163 wound in a belt shape is formed at one end of the elastic unit 160.

A stepped region 154 may be formed at the first arm member 151 in a shape to encompass the through hole 153a. The connection shaft 156 may be implemented as a rivet, etc. One end of the connection shaft 156 may be formed in the form of a rivet head, thereby being mounted in the stepped region 154.

Limiting portions 155a and 155b for limiting motion of the elastic unit 160 due to its elastic force may be formed at one of the first and second arm members 151 and 152. The first limiting portion 155a formed as a part of the stepped region 154 is cut may be disposed at the first arm member 151.

The elastic unit 160 is disposed so that at least a part thereof can be locked by the first limiting portion 155a.

The second limiting portion 155b may be protrudingly formed at one surface of the second arm member 152 toward the elastic unit 160, thereby locking a part adjacent to another end 161b of the elastic unit 160. Even if the first and second arm members 151 and 152 perform a relative rotation with respect to each other, the elastic unit 160 is not rotated but wound due to a reciprocal operation between the first and second limiting portions 155a and 155b.

As the first and second arm members 151 and 152 perform a relative rotation with respect to each other, the elastic unit 160 is wound like a spiral spring. Here, a wound degree of the elastic unit 160 becomes different according to a relative rotation angle of the first and second arm members 151 and 152.

As the elastic unit 160 is wound, a bending moment corresponding to a wound degree occurs at the elastic unit 160 in a wound direction. By the bending moment, the elastic unit 160 provides an elastic force to the first and second arm members 151 and 152. Accordingly, the second slide member 142 connected to the first arm member 151 or the second arm member 152 receives the elastic force when the portable terminal performs a sliding motion.

Since the elastic unit 160 is formed on the same plane, the slide module 140 having the elastic unit 160 may have a thickness thinner than that of a slide module to which a coil spring is applied. This may allow the portable terminal to have a thin thickness.

A stopper (not shown) for limiting a range of relative motion of the first and second arm members 151 and 152 may be formed at the first and second arm members 151 and 152. The stopper may be formed at the first and second arm members 151 and 152, respectively, so that the first and second arm members 151 and 152 having rotated by a predetermined angle can be stopped by contacting each other.

FIGS. 7A to 7D are disassembled views showing modification examples of the elastic force providing unit of the present invention.

Figure 7A:
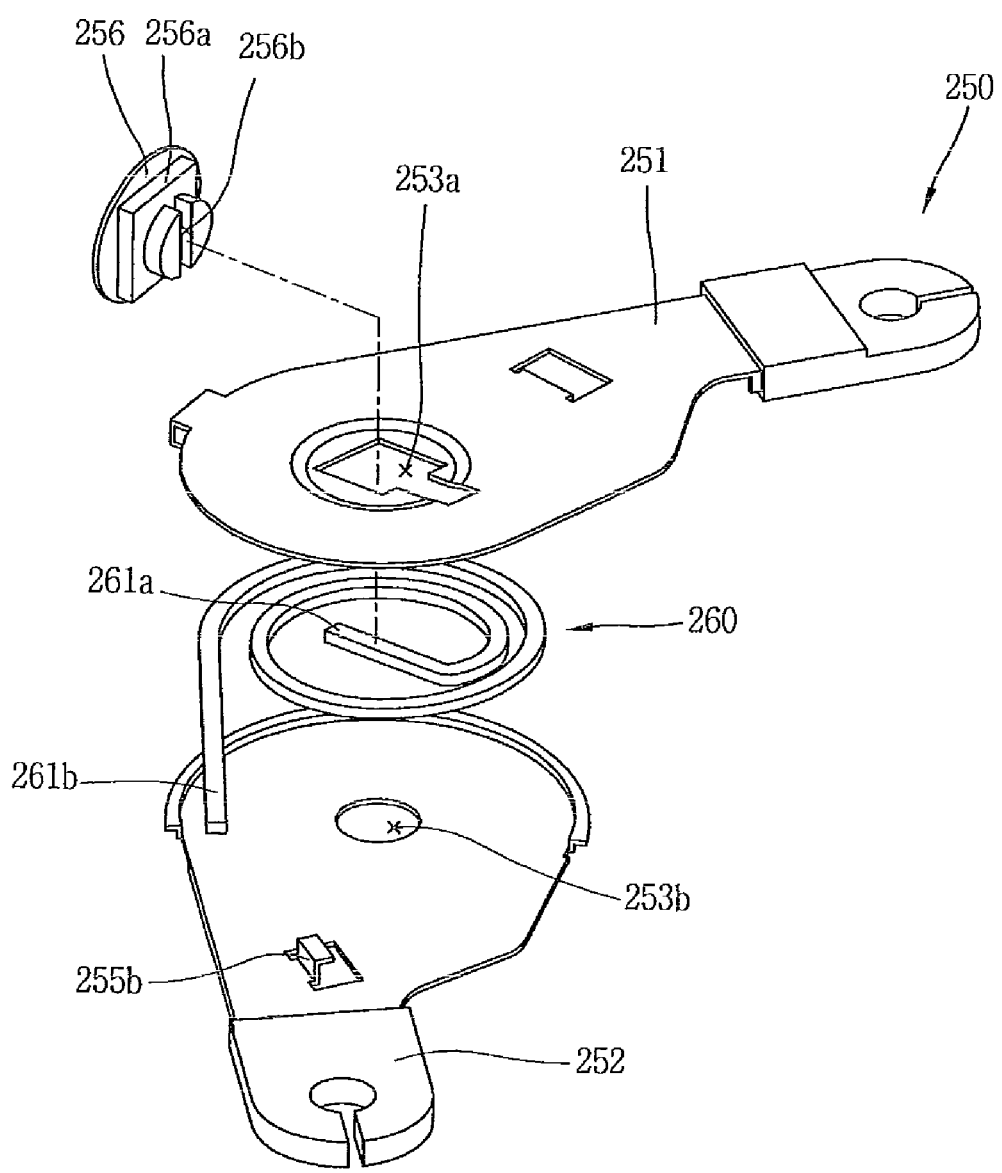
FIGS. 7A to 7D are disassembled views showing modification examples of the elastic force providing unit of the present invention.

Referring to FIG. 7A, a connection shaft 256 is disposed to face one or more parts of an elastic unit 260 so as to limit motion of the elastic unit 260.

The connection shaft 256 is formed to couple first and second arm members 251 and 252 to each other. Through holes 253a and 253b may be formed at an overlapped part of the first and second arm members 251 and 252. The first and second arm members 251 and 252 may be connected to each other by the connection shaft 256 penetrating the through holes 253a and 253b. The connection shaft 256 may be implemented as a rivet, etc.

The connection shaft 256 is provided with an angular portion 256a at one or more parts thereof. And, at least one of the through holes 253a and 253b may be formed in correspondence to the angular portion 256a. A groove 256b for is inserting one or more parts of the elastic unit 260 may be formed at the connection shaft 256.

Hereinafter, an assembly process of the elastic force providing unit 250 will be explained.

Firstly, the angular portion 256a is assembled with the through hole 253a, thereby coupling the connection shaft 256 to the first arm member 251. Then, the elastic unit 260 is inserted into the groove 256b of the connection shaft 256. Next, the connection shaft 256 is inserted into the through hole 253b of the second arm member 252, and undergoes a riveting process. The elastic force providing unit 250 may be firmly assembled in this simple manner.

Figure 7B:
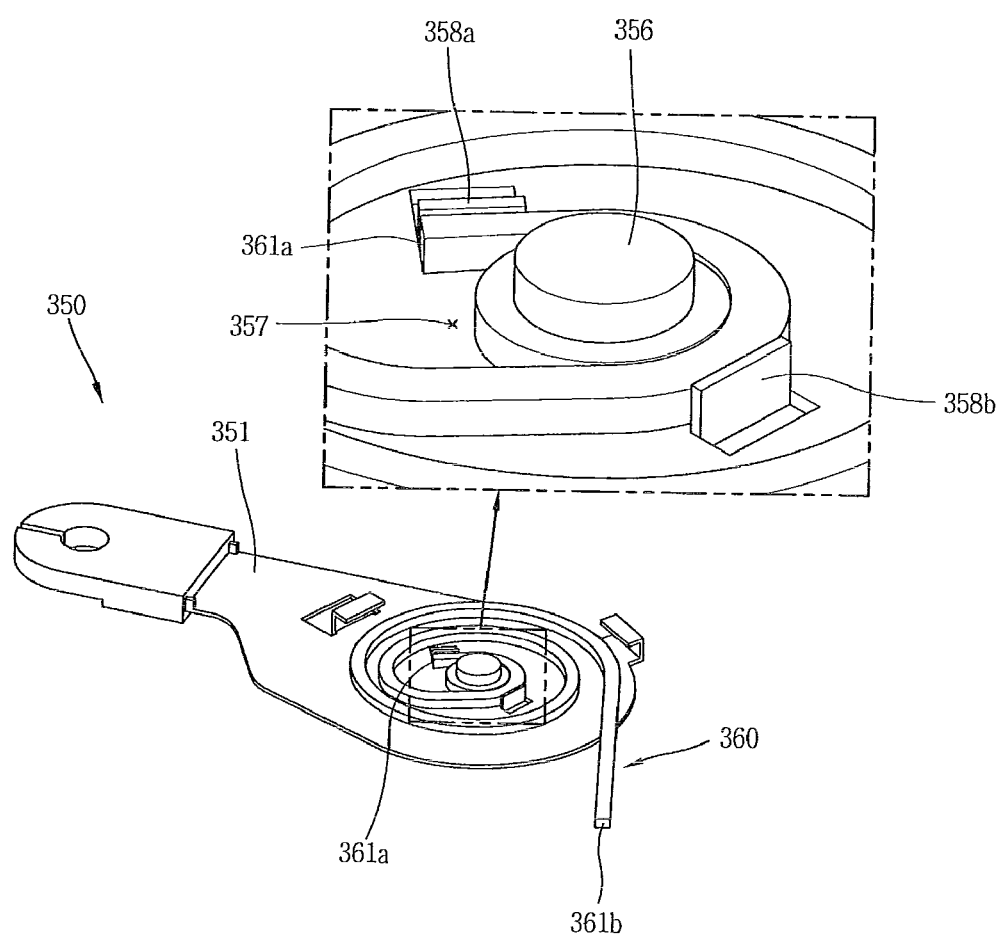

Referring to FIG. 7B, at least one of protrusions 358a and 358b may be formed at an arm member 351. The arm member 351 may serve as at least one of the first and second arm members 151 and 152 coupled to each other (refer to FIG. 5).

At least one of the protrusions 358a and 358b is formed to face an outer circumference of an elastic unit 360 having a circular belt shape. This allows rotation of the elastic unit 360 to be limited. The protrusions 358a and 358b may be spacing from each other by a predetermined interval therebetween along the circumference of the elastic unit 360. And, the protrusions 358a and 358b may be protruding from a planar surface of the arm member 351 in a bent manner, for example.

The elastic unit 360 may be integrally formed with the arm member 351 by welding. A part adjacent to one end 361a of the elastic unit 360 may be coupled to at least one of the protrusions 358a and 358b by welding. The welding may include an electric resistance welding (ERW) process.

Figure 7C:
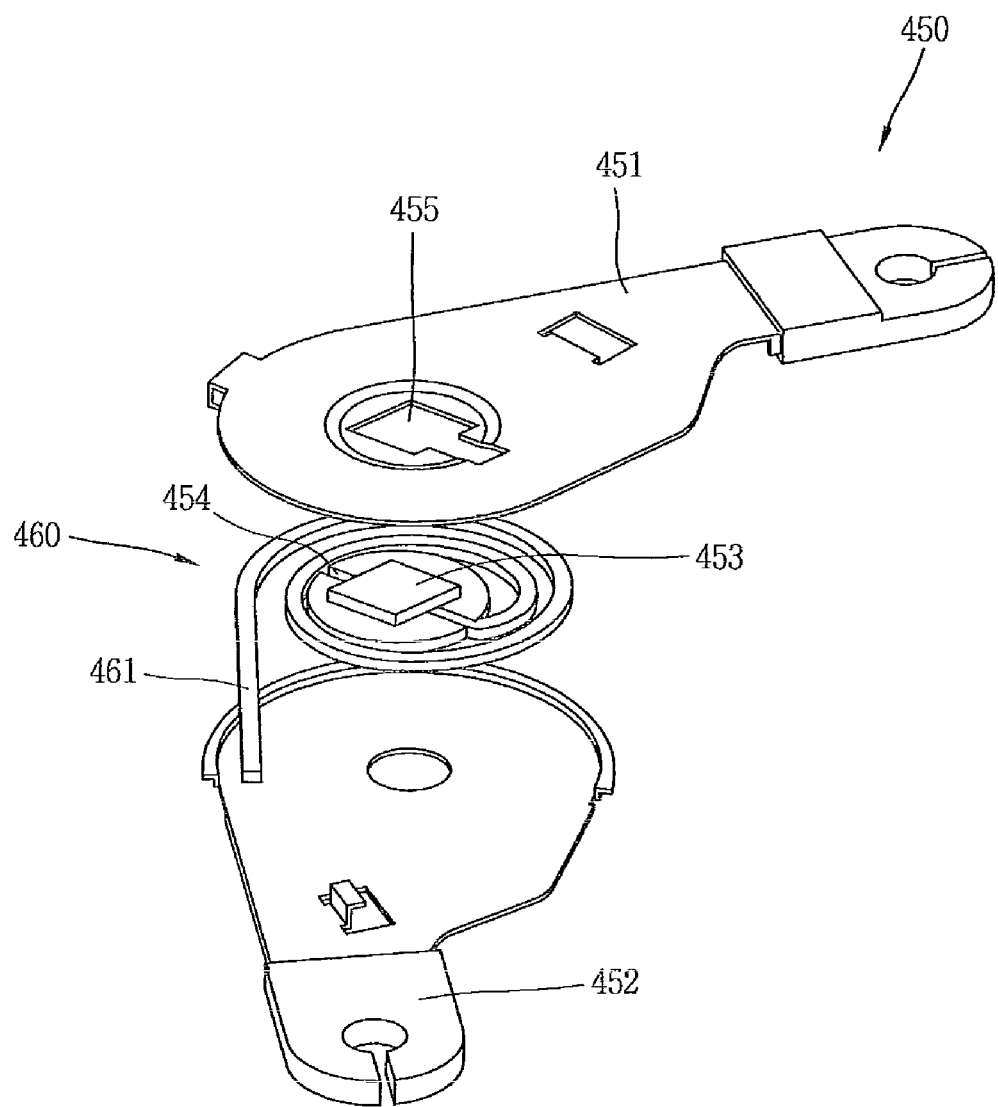

Referring to FIG. 7C, an elastic force providing unit 450 includes a fixing portion 453 to mount an elastic unit 460. The fixing portion 453 may be implemented as a body having a gap 454. One end of the elastic unit 460 may be inserted into the gap 454.

A coupling portion 455 having a shape corresponding to the fixing portion 453 is formed at a first arm member 451 or a second arm member 452. A spring fixing portion 253 is coupled to the coupling portion 455 of the first arm member 451.

Figure 7D:
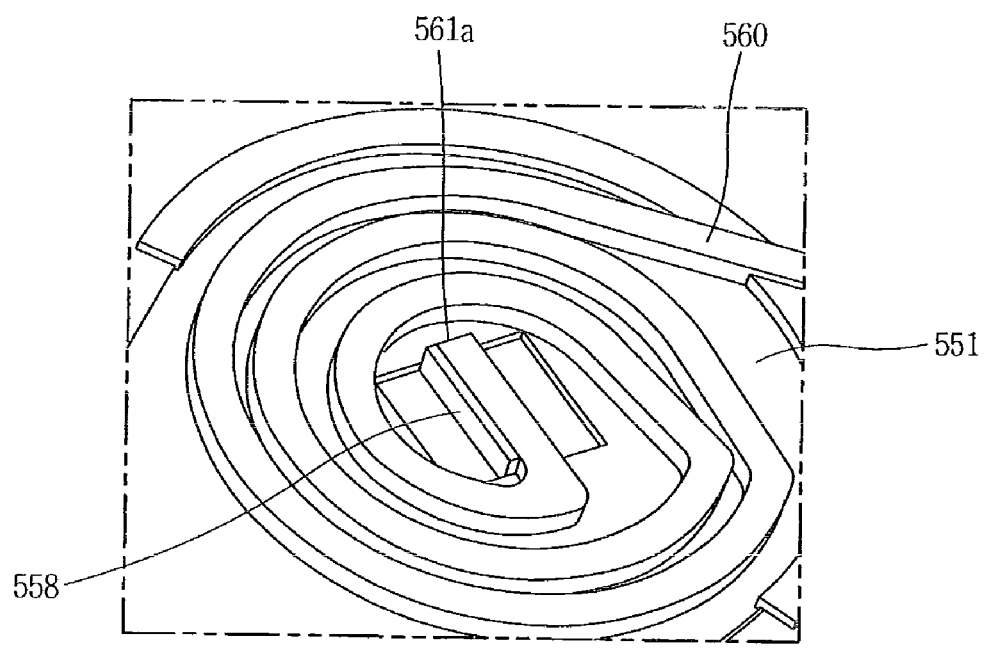

Referring to FIG. 7D, a part adjacent to one end 561*a* of an elastic unit 560 is welded to a first arm member 551, thereby being integrally formed with the first arm member 551. A welding guide 558 may be protrudingly formed at one surface of the first arm member 551 so as to be welded to the elastic unit 560. Another end of the elastic unit 560 may be configured to be locked by the second limiting portion 155*b* of FIG. 5. This may allow an elastic force providing unit 550 to be integrally implemented.

Figure 8:
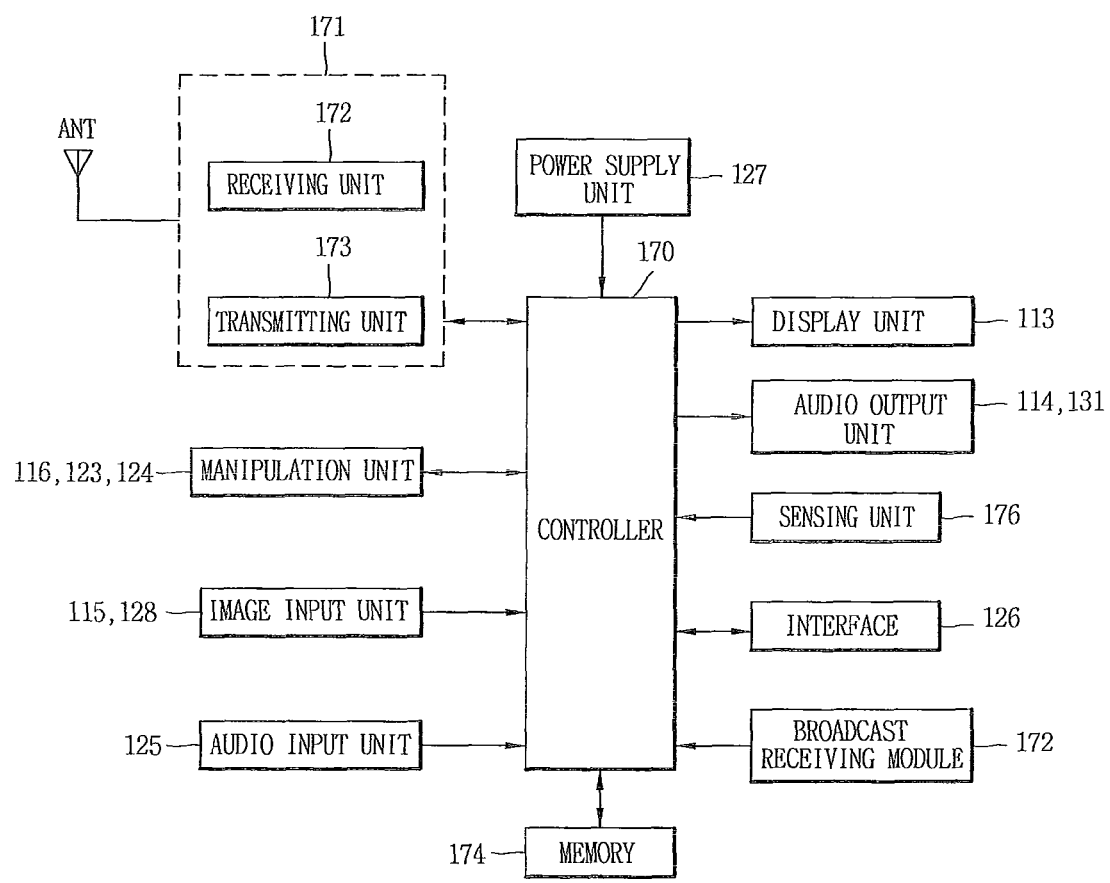
FIG. 8 is a block diagram showing the portable terminal of the present invention.

FIG. 8 is a block diagram of the portable terminal according to the present invention.

Referring to FIG. 8, the portable terminal may comprise components, such as a wireless communication module 171, manipulation units 116, 123 and 124, image input units 115 and 128, an Audio input unit 125, a display unit 113, audio output units 114 and 131, a sensing unit 176, an interface 126, a broadcasting signal receiving module 175, a memory 174, a power supply unit 127, and a controller 170.

The controller 170 typically controls the overall operations of the portable terminal. For example, the controller 170 performs the control and processing associated with telephony calls, data communications, video calls, and the like.

The wireless communications module 171 transmits or receives wireless signals to/from a base station through an antenna. For instance, the wireless communications module 171 transmits or receives voice data, text data, video data, and control data under control of the controller 170. And, the wireless communications module 171 includes a transmitting portion 172 for transmitting a signal through a modulation process, and a receiving portion 173 for demodulating a received signal.

As shown in FIG. 1, the manipulation units 116, 123 and 124 provide, to the controller 170, key input data input by a user so as to control the operation of the portable terminal. The manipulation units 116, 123 and 124 may be implemented as dome switches or a touch screen or a touch pad for receiving commands or information by a user's push or touch operation, or may be implemented as a jog wheel or a joystick The image input units 115 and 128 process image frames of still images or moving images captured by an image sensor in a video call mode or a capturing mode. Then, the processed image frames are converted into video data that can be displayed on the display unit 113, and then are output to the display unit 113.

Under control of the controller 170, the image frames processed by the image input units 115 and 128 may be stored in the memory 174, or may be outwardly transmitted through the wireless communications module 171.

The audio input unit 125 receives external audio signals by a microphone in a call mode, or a recording mode, or a voice recognition mode, and so on, and then processes the received audio signals into electric voice data.

In the case of a call mode, the processed voice data is converted into data that can be transmitted to the base station through the wireless communications module 161, and then is output to the wireless communications module 161. In the case of a recording mode, the processed voice data is output so as to be stored in the memory 164.

The audio input unit 125 may include assorted noise removing algorithms to remove noise generated in the course of receiving an external audio signal.

The display unit 113 may display information processed in the portable terminal. For instance, when the portable terminal is in a call mode, User Interface (UI) or Graphic User Interface (GUI) relating to a call is displayed under control of the controller 170. And, when the display unit 13 includes a touch screen, it serves as an input device as well as an output device.

In various modes including a call-receiving mode, a call-placing mode, a recording mode, a voice recognition mode and a broadcast reception mode, the audio output units 114 and 131 convert audio data received from the wireless communication module 171, or audio data stored in the memory 174 thereby to outwardly output under control of the controller 170.

The audio output units 114 and 131 output audio signals relating to functions executed in the portable terminal (e.g., call signal receiving sound, message receiving sound, and so on). The audio output units 114 and 131 include a speaker, a receiver, a buzzer, and so on.

The sensing unit 176 senses the current status of the portable terminal such as an open/close status of the portable terminal, a position of the portable terminal, and presence or absence of a user's contact with the portable terminal, thereby generating sensing signals to control the operation of the portable terminal. As an example, when the portable terminal is a slide-type portable terminal, the sensing unit 176 may sense whether a sliding portion of the portable terminal is open or closed. Then, the sensing unit 176 outputs results of the sensing to the controller 170, and thereby the operation of the portable terminal is controlled. Other examples include the sensing unit 176 sensing the presence or absence of power provided by the power supply unit 127, the presence or absence of coupling or other connection between the interface 126 and an external device, and so on.

The interface 126 interfaces a wire/wireless headset, an external charger, a wire/wireless data port, and a card socket (e.g., memory card, SIM/UIM card) rather than the portable terminal, with all types of external devices connected to the portable terminal. The interface 126 receives data or power from an external device, and transmits it to each component inside the portable terminal. Otherwise, the interface 126 transmits data inside the portable terminal to an external device.

The memory 174 may store a program to activate the controller 170, or may temporarily store input/output data (e.g., phonebook, messages, still images, moving images, and so on).

Furthermore, the memory 174 stores a program for controlling the operation of the portable terminal of the present invention.

The memory 174 includes the concepts of the general hard disc, card-type memory (e.g., SD or XD memory), flash memory, RAM, ROM, and so on.

The broadcasting signal receiving module 175 receives a broadcasting signal transmitted through satellite or terrestrial waves, etc., and converts the signal into broadcasting data that can be output to the audio output units 114 and 131, and the display unit 113 thereby to output it to the controller 170. The broadcasting signal receiving module 175 receives broadcasting-related additional data (e.g., Electric Program Guide: EPG, channel list, etc.). Broadcasting data and additional data converted by the broadcasting signal receiving module 175 may be stored in the memory 174.

The power supply unit 127 receives external or internal power under control of the controller 170, and supplies the power to each component of the portable terminal.

In the portable terminal of the present invention, the slide module is configured to have a thin thickness owing to the elastic unit having a spiral form. This enables a larger elasticity to occur in the same volume, and allows the portable terminal to have a thin thickness.

Furthermore, the first and second arm members overlap each other and a spring is disposed at an overlapped part, thereby enhancing reliability of the spring. And, the slide module has an enhanced assembly characteristic owing to the connection shaft protruding from the arm members.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal having a slide module, comprising:
    first and second slide members coupled to first and second bodies, respectively, and connected to each other so as to perform a sliding motion with respect to each other; and
    an elastic force providing unit for providing an elastic force to one of the first and second slide members,
    wherein the elastic force providing unit comprises:
        first and second arm members each having one end coupled to the first or second slide member, and the first and second arm members having other ends coupled to each other so as to perform a relative motion with respect to each other; and
        a spiral spring configured to generate the elastic force by a relative motion of the first and second arm members,
    wherein the first and second arm members overlap each other at the other ends thereof, the spiral spring being positioned at an overlapped part of the first and second arm members,
    wherein through holes are formed at the overlapped part of the first and second arm members and the first and second arm members are connected to each other by a connection shaft penetrating the through holes,
    wherein one end of the spiral spring forms a circular belt and at least a part of the connection shaft is inserted into the circular belt,
    wherein another end of the spiral spring is formed to be positioned at a region out of an outer circumference of the spiral spring, and
    wherein a limiting portion for limiting motion of the spiral spring due to its elastic force is formed at one of the first and second arm members and the limiting portion is configured to hook the other end of the spiral spring.

2. The portable terminal having a slide module of claim 1, wherein the first and second arm members are coupled to each other so as to perform a relative motion with respect to each other, and
    wherein the spiral spring is formed such that at least a part thereof is wound by a relative motion of the first and second arm members.

3. The portable terminal having a slide module of claim 2, wherein the elastic force providing unit is formed so as to provide a repulsive force to the first and second arm members, the repulsive force being due to a bending moment occurring at the spiral spring in a direction that the spiral spring is wound.

4. The portable terminal having a slide module of claim 1, wherein the first and second arm members are configured in the form of plates.

5. The portable terminal having a slide module of claim 1, wherein the spiral spring is implemented as a spiral wound toward a central portion from an outer circumference on the same plane.

6. The portable terminal having a slide module of claim 5, wherein said one end of the spiral spring is positioned at a central portion of the spiral.

7. The portable terminal having a slide module of claim 1, wherein the elastic force providing unit comprises one or more protrusions configured so as to face an outer circumference of the circular belt.

8. The portable terminal having a slide module of claim 7, wherein the protrusion is protruding from at least one of the first and second arm members.

9. The portable terminal having a slide module of claim 7, wherein the protrusion and the spiral spring elastic unit are coupled to each other by a welding process.

10. The portable terminal having a slide module of claim 1, wherein the elastic force providing unit is formed so as to be symmetrical based on the overlapped part of the first and second arm members.

11. The portable terminal having a slide module of claim 1, wherein the elastic force providing unit is formed to have the same appearance in both directions toward outer surfaces opposite to facing surfaces of the first and second arm members.

12. The portable terminal having a slide module of claim 1, wherein a groove for inserting at least a part of the spiral spring is formed at the connection shaft.

* * * * *